(12) United States Patent
Hamilton

(10) Patent No.: US 7,123,840 B2
(45) Date of Patent: Oct. 17, 2006

(54) INFRARED SIGNAL COMMUNICATION SYSTEM AND METHOD INCLUDING TRANSMISSION MEANS HAVING AUTOMATIC GAIN CONTROL

(75) Inventor: T. Allan Hamilton, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 230 days.

(21) Appl. No.: 10/349,735

(22) Filed: Jan. 22, 2003

(65) Prior Publication Data
US 2003/0128988 A1 Jul. 10, 2003

Related U.S. Application Data

(63) Continuation of application No. 09/131,825, filed on Aug. 10, 1998, now Pat. No. 6,590,682.

(51) Int. Cl.
H04B 10/00 (2006.01)

(52) U.S. Cl. ............ 398/137; 398/118; 398/120; 398/162; 398/197; 398/135; 398/128; 398/136; 455/69; 455/88; 455/522

(58) Field of Classification Search ............ 398/118, 398/120, 137, 162, 197, 135, 128, 136; 455/69, 455/88, 522
See application file for complete search history.

(56) References Cited

U.S. PATENT DOCUMENTS 4,777,653 A * 10/1988 Bonnerot et al. ............ 455/69
5,469,285 A * 11/1995 Gut .............................. 398/41
5,508,836 A * 4/1996 DeCaro et al. ............. 398/202
5,517,608 A * 5/1996 Suzuki et al. ................ 398/23
5,710,981 A * 1/1998 Kim et al. .................... 455/69
5,801,860 A * 9/1998 Yoneyama ................... 398/94
5,812,295 A * 9/1998 Kitasagami .................. 398/38
5,822,099 A * 10/1998 Takamatsu ................. 398/162
5,887,245 A * 3/1999 Lindroth et al. ............. 455/69
6,246,499 B1 * 6/2001 Kunito et al. .............. 398/162
6,590,682 B1 * 7/2003 Hamilton .................... 398/139
6,647,212 B1 * 11/2003 Toriumi et al. ............ 398/120

FOREIGN PATENT DOCUMENTS

| EP | 0 641 095 A1 | 3/1995 |
| EP | 0641095 | 3/1995 |
| JP | 09069817 | 3/1997 |
| WO | WO 99/53632 | 10/1999 |

* cited by examiner

Primary Examiner—Hanh Phan
(74) Attorney, Agent, or Firm—Silicon Edge Law Group LLP; Darien K. Wallace; T. Lester Wallace

(57) ABSTRACT

An Improved Infrared Signal Communication System and Method Including Transmission Means Having Automatic Gain Control is disclosed. Also disclosed is system and method that adjusts signal transmission power in response to incident signal power amplitude. The preferred system includes a control signal loop within the signal receiving system, and the system further includes a signal transmitting system that is responsive to the control signal loop. The preferred system includes manual, semi-automatic and automatic modes of operation. Still further, the preferred method includes at least two Ir-enabled appliances "stepping" each other "down" in transmit power in response to directives issued by the other Ir-enabled appliance.

20 Claims, 5 Drawing Sheets

INFRARED SIGNAL COMMUNICATION SYSTEM AND METHOD INCLUDING TRANSMISSION MEANS HAVING AUTOMATIC GAIN CONTROL

CROSS-REFERENCE TO RELATED APPLICATION

This application is a continuation of application Ser. No. 09/131,825, filed Aug. 10, 1998, now U.S. Pat. No. 6,590,682, which application is incorporated herein in its entirety by this reference.

BACKGROUND OF THE INVENTION

1. Field of the Invention

This invention relates generally to infrared communications systems and, more specifically, to an Improved Infrared Signal Communication System and Method Including Transmission Means Having Automatic Gain Control.

2. Description of Related Art

As technology becomes continually more accessible to the "common man," the ability to use, store, transfer and otherwise manipulate information has become the focus of most businesses as well as for the individual consumer. Access to the information resources is commonly by some sort of network system, including World Wide Web, "Intranets", local area networks, wide area networks, as well as corporate databases.

While the conventional method for connecting to one of these information networks has been via cable and wire, as the reliance upon connectivity to information has deepened, the desire to gain such access from mobile or portable devices has strengthened. These portable devices, such as Personal Digital Assistants, hand-held computers, cellular telephones, and even digital cameras are now being connected to each other and to networks via Infrared Data Communications. In fact, it is virtually impossible to purchase a notebook computer today that does not include an Infrared Data Communications assembly resident within it.

One drawback of these portable devices or appliances is their inherent dependency upon portable power sources (i.e. batteries of some sort). As functionality is added to the device, so is demand upon the portable power source, therefore any way of reducing the demand upon the portable power source is extremely desirable. One particular system that can place a significant demand upon the portable power source is the Ir transmission subsystem. FIGS. 1A–1C provide pertinent details about this subsystem. FIGS. 1A, 1B and 1C depict Infrared communications between a pair of conventional Ir-enabled appliances. As shown in FIG. 1A, a first Ir-capable appliance 10 is in Ir-communication with a second Ir-capable appliance 12. Of crucial importance to reliable Ir communications is the requirement that the Ir signal transmissions 14 be strong enough to cross the separation distance 16 between the two appliances 10 and 12 (in addition to any other interferences with transmission and receipt).

FIG. 1B depicts one-half of the communications loop depicted by FIG. 1A. In FIG. 1B, the first appliance 10 is the transmitting appliance 11, and the second appliance 12 is the receiving appliance 13. Under the current IrDA (Infrared Data Association) standards, all Ir signal transmissions 14 must be adequate to cross a separation distance 16 of 1 (one) meter. Jn order to achieve this range consistently, devices have been designed with a constant, default transmit power setting ($P_{TXO}$) that will insure that the receiving appliance 13 receives a certain minimum receive power ($P_{RCVMIN}$). As mentioned earlier, $P_{TXO}$ is of a constant, fixed magnitude that will result in a received power equal to $P_{RCVMIN}$ when the separation distance 16 is 1 (one) meter.

While this system design does insure reliable Ir communications at the separation distance 16 specified by the IrDA, it is also very wasteful. Under common usage conditions, once a communications loop has been initialized, the transmitting appliance 11 and receiving appliance 13 are usually placed much closer to one another than one meter for the actual data transfer process. As depicted by FIG. 1C, where the separation distance 16 is 0.5 meter, the Ir transmissions "overshoot" the receiving appliance 13. This is a critical problem for a device class (i.e. portable electronic devices) where power efficiency is of primary importance.

FIG. 2 captures the magnitude of the inefficiency of the prior systems. FIG. 2 is a graph illuminating the effect of Ir transmit range on transmit power requirements. It should be understood that there is an inverse square relationship between the transmit distance and the power required to make such a transmission. Consequently, where all transmissions are made at the default power $P_{TXO}$, there is significant waste. For example, if $P_{TXO}$ is assumed to be 500 mA (i.e. to reach a distance of one meter), then only approximately 25 mA would be required to reliably reach one-half that distance (i.e. 0.5 meter). This means that the transmissions are 80% overpowered at a 0.5 meter separation distance! What would be beneficial would be an Ir transmission system that adjusts its transmit range (and its $P_{TX}$) to the minimum level for reliable communications ($P_{TXMIN}$) "on the fly", so that such power waste is minimized.

FIG. 3 gives additional enlightenment regarding this problem; it is a graph illuminating the effect of transmission distance 16 on received signal strength. It can be seen that at one meter, the magnitude of the received power $P_{RCV}$ is at a level sufficient to support reliable communications $P_{RCVMIN}$. The problem is that as the separation distance goes to zero, the received power $P_{RCV}$ goes up until it virtually equals the default transmit power $P_{TXO}$. In this example, at close distances the receiver signal overpower 20 (i.e. the difference between $P_{TX}$ and $P_{RCVMIN}$) is relatively large compared to $P_{RCVMIN}$ (the amplitude which would provide completely reliable communications). What is needed is a system and transmission method that automatically reduces the magnitude of the receiver signal overpower 20 to minimum levels.

SUMMARY OF THE INVENTION

In light of the aforementioned problems associated with the prior devices and methods, it is an object of the present invention to provide an Improved Infrared Signal Communication System and Method Including Transmission Means Having Automatic Gain Control. The preferred system and method should adjust signal transmission power in response to incident signal power amplitude. It is an object that the preferred system include a control signal loop within the signal receiving system, and that the signal transmitting system is responsive to this control signal loop. It is a further object that the system include manual, semi-automatic and automatic modes of operation. It is yet another object that the preferred method include at least two Ir-enabled appliances "stepping" each other "down" in transmit power in response to directives issued by the other Ir-enabled appliance.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Infrared Signal Communication System and Method Including Transmission Means Having Automatic Gain Control.

Figure 4A:
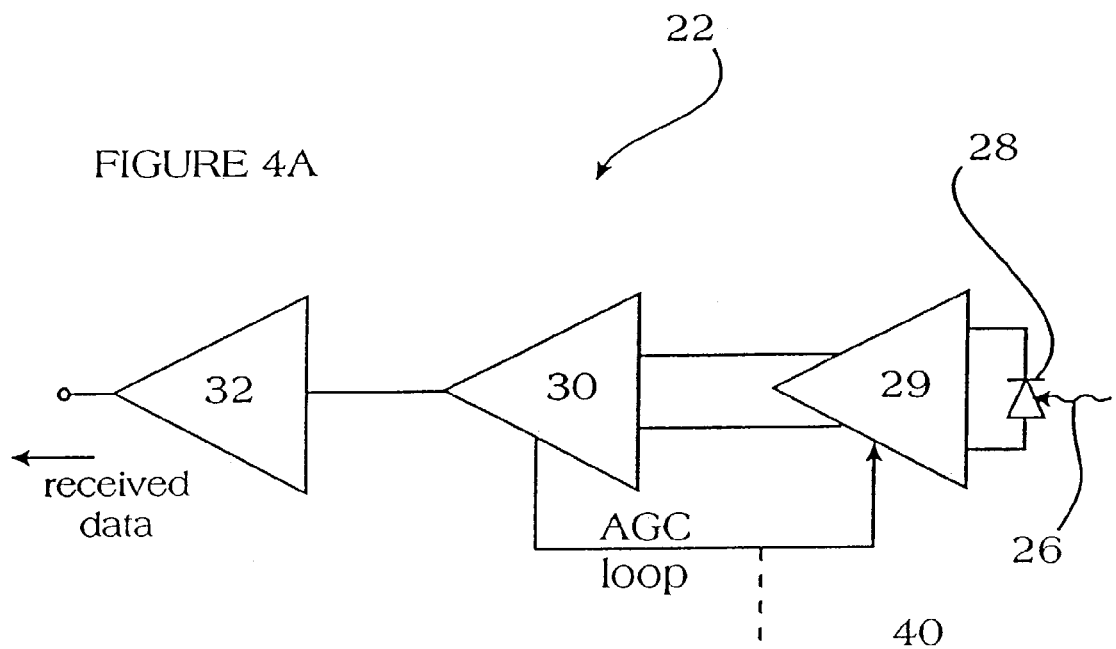
FIGS. 4A and 4B are circuit diagrams of preferred Ir receive and Ir transmit subsystems of the present invention.
Figure 4B:
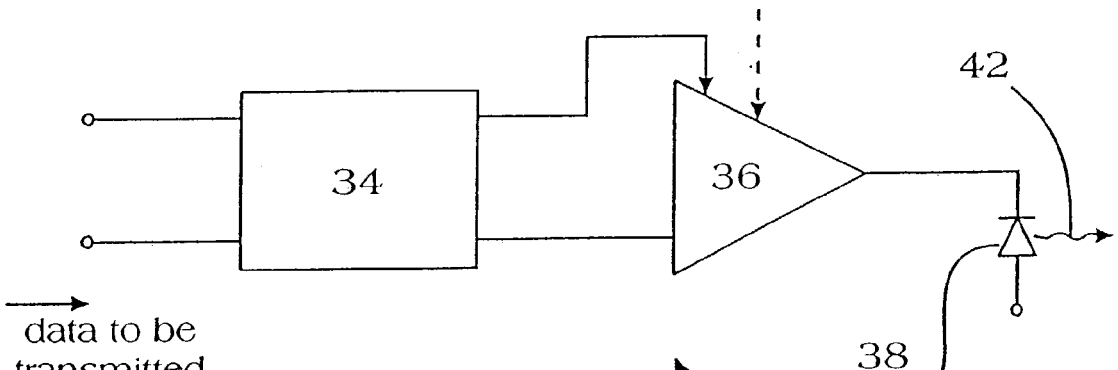

The present invention can best be understood by initial consideration of FIGS. 4A and 4B. FIGS. 4A and 4B are circuit diagrams of preferred Ir receive and Ir transmit subsystems, 22 and 24 (or receive and transmit means), of the present invention. As can be seen, incident Ir signals 26 are detected by an Ir receive diode 28. The incident signal is amplified by an amplifier 29 so that the signal amplitude will be within some preferred range. The output of the amplifier 29 preferably enters a comparator 30, which compares the amplified signal to some desired amplitude. The comparator 30 sends a control signal back to the amplifier 29 via the Automatic Gain Control loop (AGC loop) to increase or decrease signal amplification exiting the amplifier 29. From the comparator 30, the received signal preferably enters the receive driver 32, where the signal is conditioned and sent on for translation and/or other use within the appliance. It is pointed out that conventional Ir receive subsystems already include an AGC feature to adjust the amplifier in response to changes in received signal power $P_{RCV}$. Conventionally, this AGC has been included in the Ir receive subsystem to prevent damage to the internal circuits of the electronic device due to excessively high $P_{RCV}$'s.

Figure 1A:
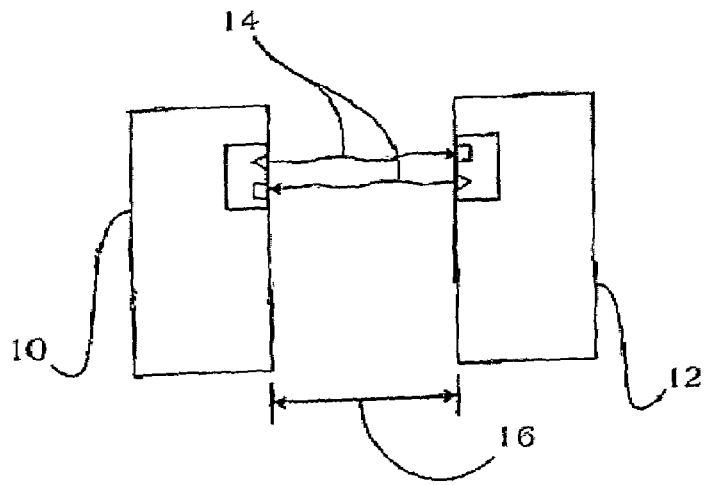
FIGS. 1A, 1B and 1C depict Infrared communications between a pair of conventional Ir-enabled appliances.
Figure 1B:
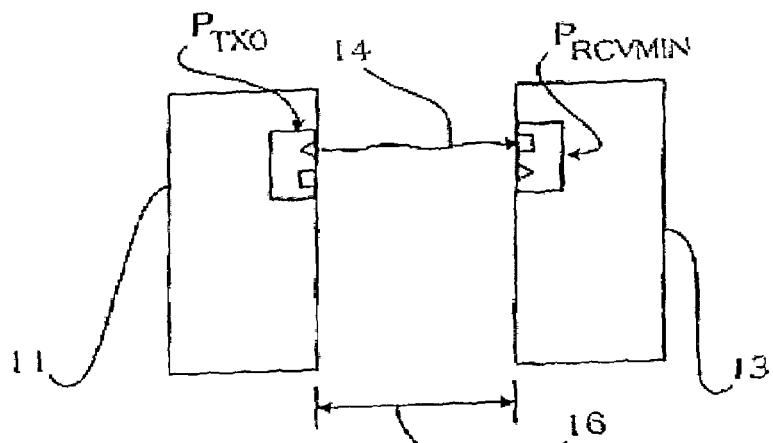
Figure 1C:
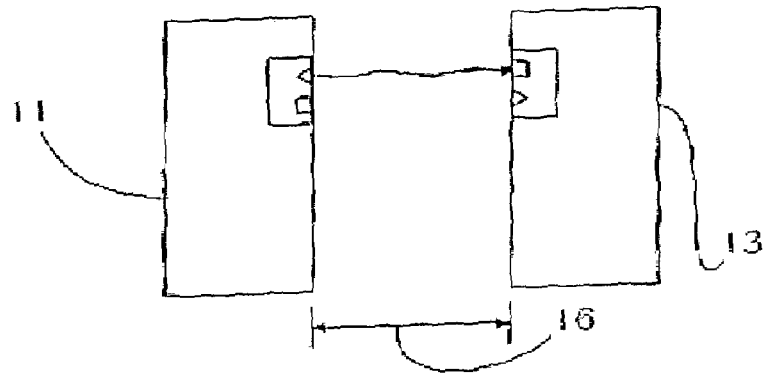
Figure 2:
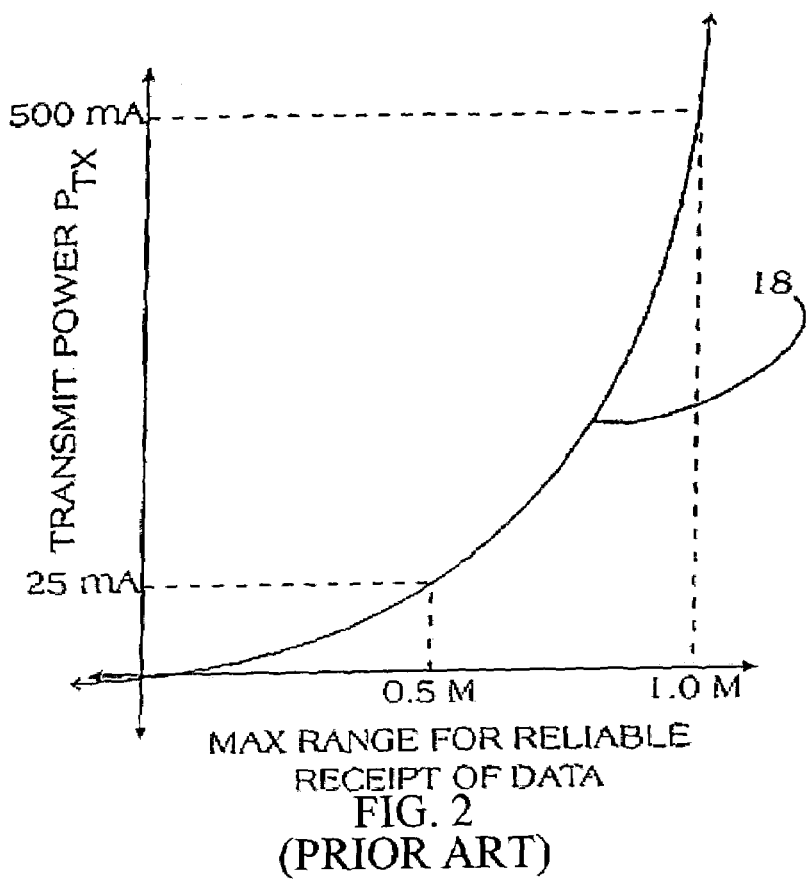
FIG. 2 is a graph illuminating the effect of Ir transmit range on transmit power requirements.
Figure 3:
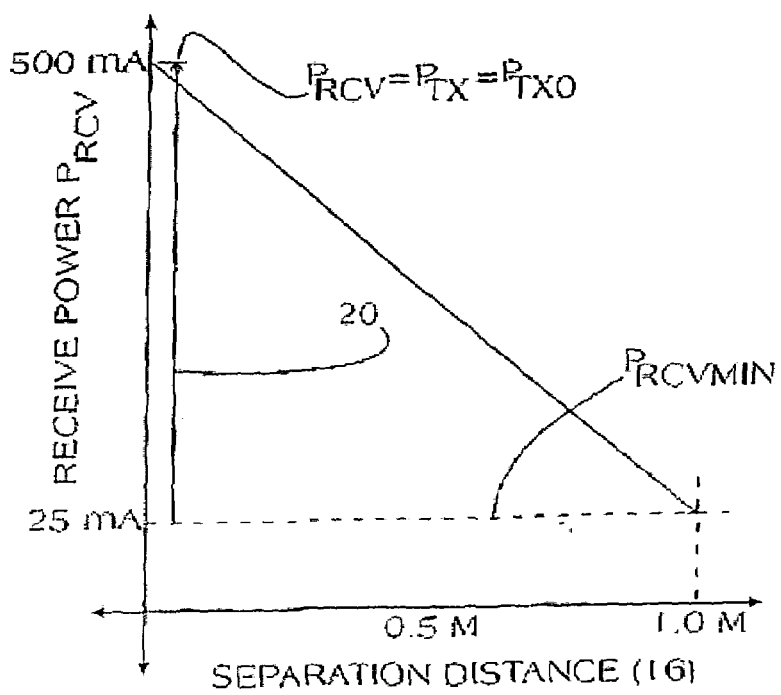
FIG. 3 is a graph illuminating the effect of transmission distance on received signal strength.

Now turning to FIG. 4B, we might understand the unique functionality of the present invention; it is a schematic diagram of a preferred design for an Ir transmit subsystem 24 of the present invention. Data entering the subsystem 24 for Ir transmission typically enters a mode and power controller 34 wherein the signal/data is formatted for effective transmission. The signal then enters a transmit driver 36, which amplifies the signal for transmission by the Ir transmit diode 38. The unique feature of the present invention is the AGC signal cross-connect 40. Essentially, the AGC signal cross-connect 40 provides the transmit driver 36 with the same feedback signal created and used by the Ir receive subsystem 22. When the other electronic appliance (see FIGS. 1A–1C) is in close proximity to the appliance in which the subsystems of FIGS. 4A and 4B reside, the AGC signal will indicate that the amplitude of the incident Ir signals 26 is large. Subsequently, the AGC signal will direct the transmit driver 36 to reduce its power setting so that the amplitude of the transmitted Ir signals 42 is optimized.

It should be appreciated that the depicted circuit designs are simply functional examples of acceptable circuits; other components and circuit designs might be used, depending upon the particular application. What is unique is the automatic and/or manual amplitude control of the transmitted Ir signals.

Figure 5:
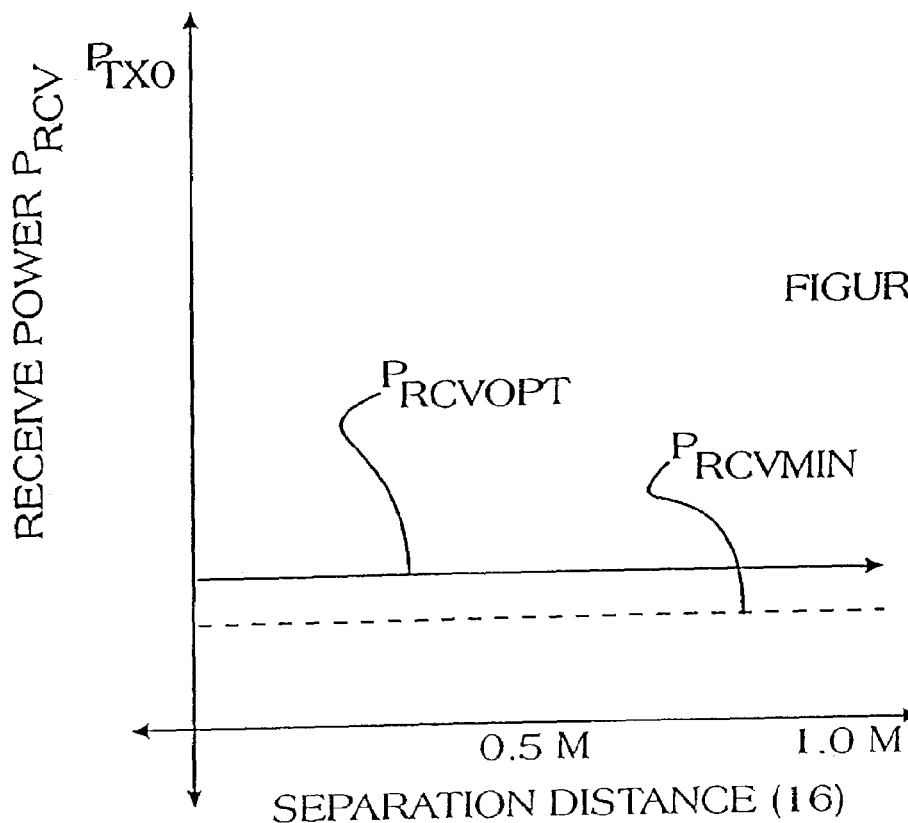
FIG. 5 is a graph depicting an optimum received power for all separation distances.
Figure 6:
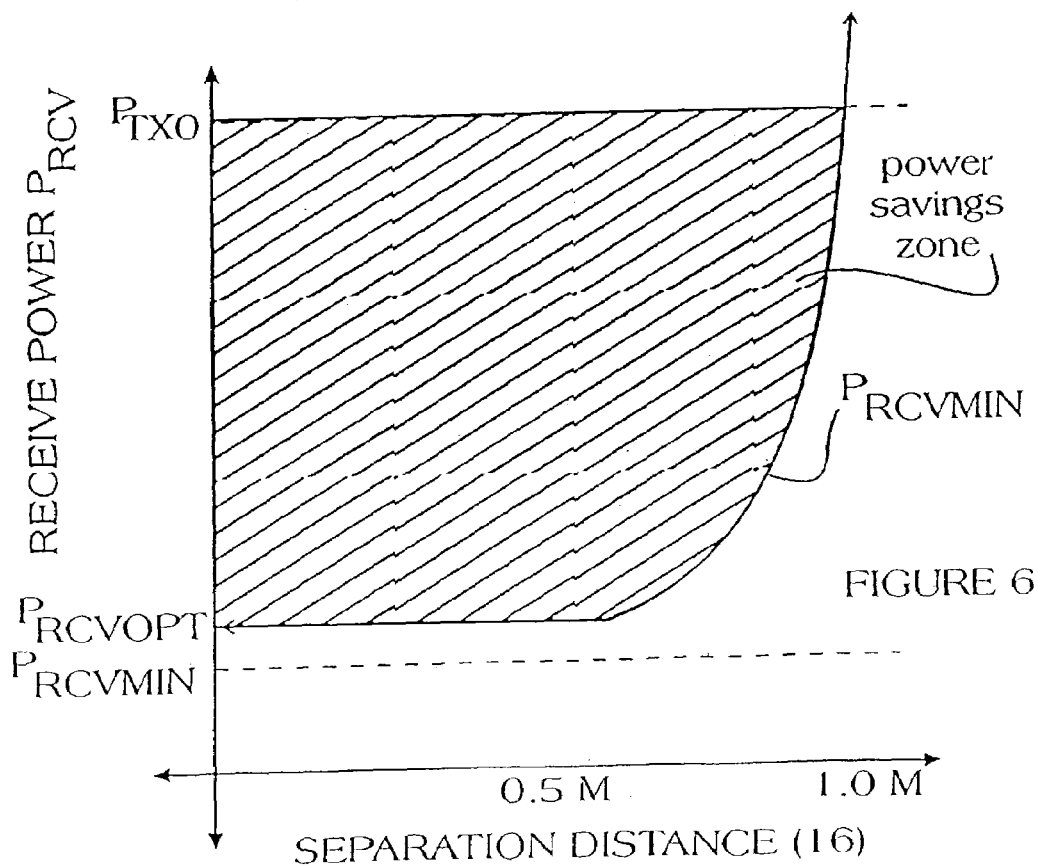
FIG. 6 is a graph depicting the effect and benefits of incorporating Automatic Gain Control on the transmit subsystem to optimize transmitter power demands.

The benefits of the improved circuit are best described by FIGS. 5 and 6. FIG. 5 is a graph depicting an optimum received signal power, $P_{RCVOPT}$, for all separation distances. $P_{TRCVOPT}$ is the "target" power amplitude for the Ir signals incident upon the receiving appliance, this power level being achieved by the system and method described above in connection with FIGS. 4A and 4B. In this example, $P_{RCVOPT}$ has been established at a level that is somewhat higher than $P_{RCVMIN}$ in order to account for conditions that may have degraded the actual transmit and receive power efficiencies of the transmitting and receiving devices. No matter what the separation distance 16 between the communicating devices, $P_{RCVOPT}$ will remain unchanged (at least as unchanged as conditions and system response will permit). Now turning to FIG. 6, we can see the benefit of reducing the target amplitude of the incident Ir signals. FIG. 6 depicts the new transmit power curve for the device of the present invention that incorporates Automatic Gain Control in the transmit subsystem. As can be seen, the AGC transmit power $P_{TXAGC}$ ranges from a minimum level of $P_{RCVOPT}$ where the separation distance 16 is small, to a maximum level of $P_{TXO}$ where the separation distance 16 approaches one meter. The shaded section indicates the area between the $P_{TXAGC}$ and $P_{TXO}$ curves. This is the zone where power savings exist from implementation of the device and method of the present invention. It should be casually apparent that the savings are significant. As an added benefit, it is pointed out that since the transmission range has been optimized, there will be less "overshoot" by Ir signals. This will act to improve the security of the communications between devices, since it will be much more difficult for an unauthorized participant to "overhear" a "conversation."

Figure 7:
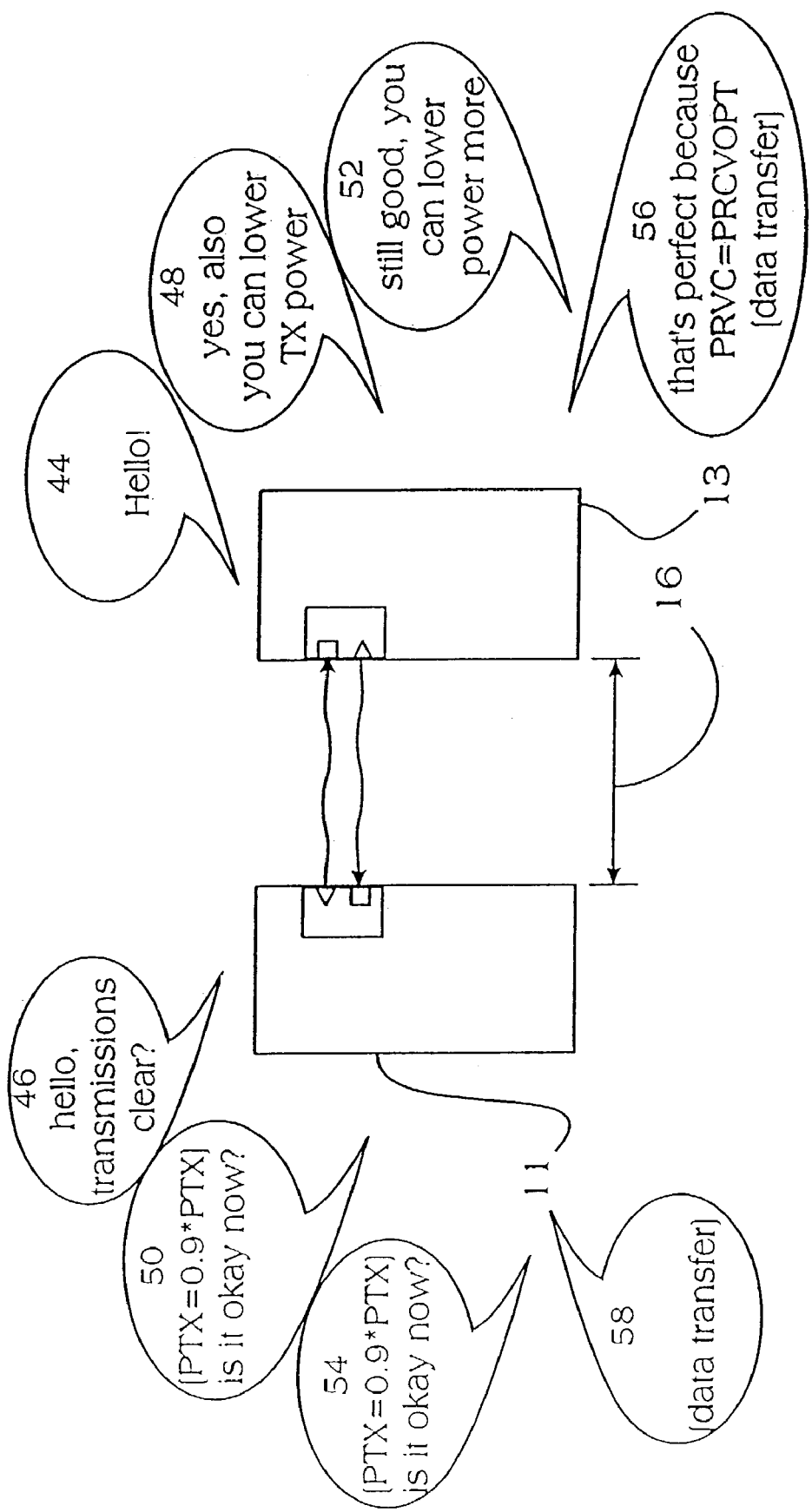
FIG. 7 depicts a typical sequence of events leading to data transfer between two Ir-enabled appliances having automatically-optimized transmit power systems.

Finally, we will consider FIG. 7 to understand an example of a preferred "conversation" between two electronic appliances incorporating the automatic gain-controlled transmitter of the present invention. In this example, the transmitting device 11 will be adjusting its transmit power level; in reality, this process (oversimplified for discussion purposes) would be followed by both devices as they establish Ir communications.

At "discovery", the receiving device 13 sends 44: "Hello", to which the transmitting device 11 replies 46: "Hello Back to You," followed by "Are My Transmissions Clear to You?". In this case, where the separation distance 16 is less than one meter, the transmitting device's 11 transmit power (initially set to $P_{TXO}$) is higher than necessary. Consequently, the receiving device 13 replies 48: "Yes, your transmissions are clear, in fact, you can reduce your transmit power by 10%". [This 10% number is arbitrary; other increments might be more appropriate under other circumstances.]

In response to this message, the transmitting device 11 adjusts $P_{TX}$ to $0.9 \times P_{TX}$, and queries 50: "How's That." Should $P_{RCV}$ at the receiving device 13 still be above $P_{RCVOPT}$, the receiving device 13 might respond 52: "That is still good, in fact, you can reduce your transmit power by another 10%." In response, the transmitting device will probably adjust $P_{TX}$ to $0.9 \times P_{TX}$, and again query 54: "How's That?" If $P_{RCV}$ is now acceptably close to $P_{RCVOPT}$, the receiving device 13 will respond 56: "That's good, because you are now close to $P_{RCVOPT}$," after which data transfer will commence 56, 58.

A final point is that the adjustment of $P_{TX}$ may be multi-modal, including the possibility for automatic, semi-automatic, and even manual adjustment of $P_{TX}$, depending upon the particular circumstances and environment.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device, comprising:
   a transmitter circuit that includes a transmitter driver;
   an infrared transmitter that receives an amplified signal from the transmitter driver, wherein the amplified signal contains transmit data, wherein the infrared transmitter transmits a transmitted infrared signal that contains the transmit data, and wherein the transmitted infrared signal has a transmit power level;
   an infrared receiver that receives an incident infrared signal, wherein the incident infrared signal contains receive data and exhibits an incident power level; and
   a receiver circuit coupled to the infrared receiver, wherein the receiver circuit outputs both the receive data and a control signal, wherein the control signal has an amplitude that depends on the incident power level, and wherein the transmit power level varies in proportion to the amplitude of the control signal.

2. The device of claim 1, wherein the transmitter driver operates to reduce the transmit power level when the control signal indicates that the incident power level is above a preset level.

3. The device of claim 1, wherein the receiver circuit includes an automatic gain control circuit, and wherein the automatic gain control circuit generates the control signal.

4. The device of claim 1, wherein the transmitter driver adjusts the transmit power level proportionately to the amplitude of the control signal when the incident power level is above a preset level.

5. The device of claim 1, wherein the transmitter circuit receives the control signal.

6. A method, comprising:
   determining an incident power level of an incident infrared signal received by an infrared receiver;
   generating a control signal having an amplitude, wherein the amplitude of the control signal depends on the incident power level; and
   adjusting a transmit power level of a transmitted infrared signal transmitted by an infrared transmitter, wherein the transmit power level varies in proportion to the amplitude of the control signal when the incident power level is above a preset value.

7. The method of claim 6, wherein the adjusting the transmit power level is accomplished automatically by electronic circuitry.

8. The method of claim 6, wherein the control signal is generated by an automatic gain control circuit.

9. The method of claim 6, wherein the control signal is generated by a receiver circuit, wherein the transmit power level is adjusted by a transmitter circuit, further comprising:
   sending the control signal from the receiver circuit to the transmitter circuit.

10. A device, comprising:
    an infrared receiver that receives an incident infrared signal, wherein the incident infrared signal exhibits an incident power level;
    a receiver circuit coupled to the infrared receiver, wherein the receiver circuit outputs a control signal, and wherein the control signal has an amplitude that depends on the incident power level;
    a transmitter circuit that includes a transmitter driver, wherein the transmitter circuit receives the control signal; and
    an infrared transmitter that receives an amplified signal from the transmitter driver, wherein the infrared transmitter transmits a transmitted infrared signal having a transmit power level, and wherein the transmitter driver controls the transmit power level based on the amplitude of the control signal.

11. The device of claim 10, further comprising:
    a control signal cross-connect line, wherein the control signal cross-connect line connects the receiver circuit to the transmitter circuit.

12. The device of claim 10, wherein the incident infrared signal contains receive data, wherein the receiver circuit outputs the receive data, wherein the amplified signal contains transmit data, and wherein the transmitted infrared signal contains the transmit data.

13. The device of claim 10, wherein the transmitter driver receives the control signal.

14. The device of claim 10, wherein the receiver circuit includes an automatic gain control circuit, and wherein the automatic gain control circuit generates the control signal.

15. The device of claim 10, wherein the device is part of a portable electronic device.

16. A device, comprising:
    an infrared receiver that receives an incident infrared signal, wherein the incident infrared signal exhibits an incident power level;
    an infrared transmitter that transmits a transmitted infrared signal having a transmit power level; and
    means for adjusting the transmit power level in proportion to the incident power level when the incident power level is above a preset value.

17. The device of claim 16, wherein the means includes an automatic gain control circuit.

18. The device of claim 16, wherein the means employs a control signal having an amplitude, and wherein the amplitude of the control signal depends on the incident power level.

19. The device of claim 16, wherein the device is part of a portable electronic device.

20. The device of claim 16, wherein there is a minimum transmit power level required for reliable communications via the transmitted infrared signal, and wherein the means adjusts the transmit power level to the minimum transmit power level for reliable communications.

* * * * *